United States Patent Office 3,128,310
Patented Apr. 7, 1964

3,128,310
RECOVERY OF AMINES
Hans-Joachim Koch, Leverkusen, Germany, assignor, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed July 31, 1959, Ser. No. 830,723
Claims priority, application Germany Sept. 9, 1955
9 Claims. (Cl. 260—582)

This invention relates to a process for the recovery of aromatic amines from the distillation residues obtained in the production of aromatic isocyanates. More particularly, the invention is concerned with a process for the recovery of aromatic amines that can be phosgenated to obtain aromatic isocyanates from distillation residues obtained in the production of aromatic isocyanates by phosgenation of aromatic amines in inert solvents followed by distillation of the reaction mixture.

This application is a continuation-in-part of my copending application, S.N. 608,433, now abandoned.

It is known to produce aromatic isocyanates by phosgenation of aromatic amines in inert solvents. As a result of the phosgenation, there is obtained a solution containing the isocyanate formed, and high boiling by-products. In order to recover the isocyanate from this solution, the latter is subjected to distillation. While the inert solvent used in the phosgenation process and the aromatic isocyanate formed distill over, the high boiling by-products form a distillation residue. Depending upon the amine used as starting material and the conditions of the phosgenation process, this high boiling residue can amount to 3 to 30 percent of the amine introduced. The chemical composition of the high boiling by-products is not entirely clear, but it is assumed that they have the nature of high molecular ureas and polymerized isocyanates. Thus far, these distillation residues have not found any commercial application. Attempts have, therefore, been made to split off the distillation residues chemically, and it has been found that by saponifying the residue with alkali at a temperature in the neighborhood of 200° C., a large part of the aromatic amine introduced into the phosgenation reaction and not converted into the corresponding isocyanate can be recovered therefrom.

When producing aromatic diisocyanates and polyisocyanates on a commercial scale, there are frequently employed technical amine mixtures containing undesirable ortho-diamines which do not yield the corresponding diisocyanates in the phosgenation reaction but are converted by ring closure into cyclic ureas (imidazolones). The distillation residue obtained in the phosgenation of such amine mixtures then contains not only the aforementioned ureas of high molecular weight but also imidazolones formed from the ortho-diamines. When working up such a distillation residue by saponification with alkali, the resulting amine mixture contains a relatively large proportion of ortho-diamines. Such an amine mixture is not suitable for use in the phosgenation reaction since the presence of relatively large amounts of ortho-diamines will cause not only a decrease in the isocyanate yield but also difficulties in carrying out the continuous phosgenation process due to the accumulation of non-volatile cyclic ureas in the reaction mixture.

It is an object of the present invention to provide a process for the utilization of the high boiling distillation residues obtained in the commercial production of aromatic isocyanates. Another object is to provide a process for the recovery of aromatic amines from said distillation residues. A further object is to provide a process for splitting said high boiling distillation residues into aromatic amines that do not contain undesirable ortho-diamines. A still further object is to provide a process for splitting said distillation residues into aromatic amines that are highly suitable for use in the phosgenation reaction, giving high yields of aromatic isocyanates. Still further objects will appear hereinafter.

These objects are accomplished in accordance with the present invention by heating the distillation residues obtained in the phosgenation of aromatic carbocylic amines with water at temperatures within the range of from about 160° C. to about 250° C. The cyclic ureas (imidazolones) present in the distillation residue are not split under these reaction conditions so that the recovered amines are free from undesirable ortho-diamines.

In one embodiment of the invention, the process is carried out in a pressure vessel equipped with a mechanical stirrer. After placing the distillation residue in the pressure vessel, it is mixed with approximately the same amount by weight of water and heated to a temperature of about 160° to about 250° C., preferably 170° to 200° C., by introducing super-heated steam or by external heating of the vessel. During the reaction, carbon dioxide is evolved, but the pressure can be regulated, if desired, by releasing some of the gas formed. It is not necessary to maintain a predetermined pressure for carrying out this embodiment of the process of the invention, but the pressure should be high enough to assure that at least part of the water used in the reaction is present in the liquid state. The reaction occurs rapidly in the above temperature range. The process may be carried out continuously with residence times in the reaction temperature range of less than about one minute but preferably of at least about five minutes. The best results in the continuous process are obtained employing residence times of about 15 minutes.

Very frequently the distillation residue contains a small amount of chlorine. It is, therefore, preferred to add a small amount of alkali, such as an aqueous solution or suspension of an alkali or earth alkali hydroxide or carbonate, to the distillation residue-water mixture prior to carrying out the splitting operation. Normally, an amount of less than 1 percent by weight, based on the weight of residue, is sufficient to neutralize the chlorine contained in the distillation residue.

On completion of the splitting reaction, the resultant dark brown aqueous reaction material is salted out while still warm, for example, by addition of caustic soda solution, sodium chloride or sodium sulfate, whereby the amine separates out in liquid form or in solid form depending upon the temperature of the reaction mixture. The amine is then recovered either by siphoning or by filtering. Instead of the separation being effected by adding salt, the solution can, if desired, be extracted with organic solvents, preferably with hydrocarbon mixtures or chlorinated hydrocarbon mixtures. The amine recovered from the reaction mixture is purified by distillation.

The residue obtained in this distillation contains the cyclic ureas which are formed from the ortho-diamine contained in the original starting material. These cyclic ureas are not split by heating with water in accordance with the process of the invention, but they can be worked up by heating with concentrated alkaline solutions to form the underlying ortho-diamines.

An alternative method of isolating the aromatic amines obtained in the splitting process according to the present invention involves venting the gas from the pressure vessel while the latter is still hot to thereby remove a large amount of the water present in the reaction mixture. The reaction mixture thus obtained is so concentrated that the addition of salt or the extraction with an organic solvent can be omitted, the amine formed being obtainable by direct distillation.

In accordance with another embodiment of the process of the invention, the distillation residue obtained in the phosgenation process is mixed with a relatively small amount of water, say 15 to 25 percent by weight, based on the weight of the distillation residue, and a minor amount of alkali to obtain a suspension. This suspension, in a finely distributed form, is heated at the required temperature, either batch-wise in a pressure vessel or continuously by pumping it through a spiral pipe (coil) heated to at least 160° C. The reaction mixture obtained in this embodiment of the process of the invention is concentrated enough to be worked up by direct distillation.

As indicated above, the process of the invention makes it possible to recover from the distillation residues obtained in the production of aromatic isocyanates those amines which are capable of reacting with phosgene to form isocyanates. The process of the invention is, therefore, particularly valuable in the large scale production of aromatic isocyanates where the presence of inoperative ortho-diamines in the recovered amines would cause operation difficulties. A further advantage of the process of the invention resides in the fact that it can be carried out very economically without the expenditure of costly chemicals.

The invention is further illustrated by the following examples without being restricted thereto.

*Example 1*

By direct nitration of toluene followed by reduction of the dinitrotoluene formed, there is obtained a technical mixture of toluylene diamines containing about 77 percent of toluylene diamine-2,4, about 19 percent of toluylene diamine-2,6 and about 4 percent of toluylene diamine-3,4, -2,3 and -3,6. This mixture is continuously phosgenated with phosgene in orthodichlorobenzene by heating the reactants to about 30° C. in a first reaction zone and subsequently to about 170° C. in a second reaction zone in accordance with the procedure described in U.S. Patent 2,680,127. In this manner, there is obtained a reaction mixture containing toluylene diisocyanate-2,4, toluylene diisocyanate-2,6, unreacted starting material, high boiling by-products and ortho-dichlorobenzene. Upon removal of unreacted phosgene by blowing with nitrogen, the solution is worked up by distillation. Ortho-dichlorobenzene, and toluylene diisocyanate-2,4 and -2,6 distill over while a high boiling distillation residue remains in the still.

A rotary-type autoclave is half filled with 500 parts of the aforementioned distillation residue in granulated form, 500 parts of water and 3 parts of calcium oxide. The autoclave is heated within about 3 hours to 170° C. A pressure of about 65 atm. is set up. The reaction is completed by heating for another two hours at 170–180° C. while rotating the autoclave. After cooling to below 100° C., the pressure is relieved, the autoclave is opened and the reaction material is mixed with 800 parts of 60 percent caustic soda solution in order to lower the solubility of the amine. During this operation, the temperature must not fall below 90° C. The brown upper liquid layer is siphoned off or separated in a separating funnel. Distillation of the amine layer, containing approximately 10–20 percent of water, yields, after aqueous first runnings, approximately 140 parts of a pure mixture of 2,4-toluylene diamine and 2,6-toluylene diamine with the approximate isomer ratio of 80:20, the yield thereof being about 40 percent of the amine not converted to the isocyanate in the phosgenation. Remaining in the residue from the distillation are dark brown products of high molecular weight and cyclic ureas which have not been split out. The aqueous bottom layer of the salted-out reaction product contains less than 1 percent of organic constituents and is rejected.

*Example 2*

A stirrer-type autoclave is half filled with a mixture of 2500 parts of the phosgenation residue more fully referred to in Example 1, but in ground form, and 2500 parts of water, with addition of ½ part of sodium hydroxide. Owing to the violence of the initial reaction with the finely powdered product, the procedure of Example 1 is modified, in that the heating to 180° C. takes place over 4 hours, that is to say, more slowly. By means of this precautionary measure, the control of the temperature and pressure can be carried out more easily. In this way, a pressure of 90–100 atm. is reached. The autoclave is kept for 3 hours at 180° C. and is then cooled to below 100° C., and is opened after relieving the pressure. The addition of 5000 parts of 55 percent caustic soda solution improves the separation of the layers. The upper brown amine layer is siphoned off and distilled. At least 1140 parts of a pure mixture of 2,4-toluylene diamine and 2,6-toluylene diamine of the approximate isomer ratio 80:20 are obtained, i.e., approximately 65 percent of the amine not converted to the isocyanate during the phosgenation. The distillation residue is dealt with in the manner indicated in Example 1.

*Example 3*

A rotary-type autoclave is half filled with 500 parts of a phosgenation residue according to Example 1, 500 parts of water and 0.5 part of calcium oxide. After being heated, the autoclave is maintained for 4 hours at a temperature of 180° C. and after cooling to 150° C., the pressure is relieved at this temperature. By this means, the autoclave is cooled by about 30–40° C., while a large part of the water in the autoclave is evaporated. The distillation of the brown reaction sludge in vacuo yields about 245 parts of a pure mixture of 2,4- and 2,6-toluylene diamine of the approximate isomer ratio 80:20. The yield corresponds to 70 percent of the diamine not converted to the isocyanate in the phosgenation.

The distillation residue is dealt with in the same way as stated in Example 1.

*Example 4*

800 parts of a residue being formed in the phosgenation of aniline are placed with 120 parts of water and 0.5 part of calcium oxide in a rotary type autoclave and heated for 4 hours to 180° C. After cooling to 100° C., the pressure is released and the contents of the autoclave subjected to distillation. The yield is 440 parts of pure aniline, this being 70.5 percent of the amine unreacted in the phosgenation. The distillation residue consists of dark brown organic products of high molecular weight.

*Example 5*

600 parts of a residue which is obtained in the phosgenation of 2,4-diaminotoluene are heated with 125 parts of water for 3½ hours in a rotary-type autoclave to 180–185° C. After cooling to approximately 100° C., the still liquid and brown contents of the autoclave are distilled in vacuo. There are obtained 290 parts of pure toluylene diamine, i.e., 69 percent of the diamine unreacted in the phosgenation. The distillation residue is a friable dark brown cake.

*Example 6*

A suspension in water of a finely ground phosgenation residue more fully referred to in Example 1 (the proportion of residue to water being 1:2) is continuously passed by means of a gear pump through a spiral tube of stainless steel which tube is heated to 210° C. The tube has a diameter of 1 cm. and is 2 meters in length. The suspension is passed through that tube in such a way that the residue time inside the tube is about 13 minutes. It is desirable to have the material warmed before introducing it into the spiral tube by passing it with the same speed through a preheater of 2 meters in length at about 150–170° C. The pressure release at the end of the spiral tube (90–110 atm.) is brought about by a high-pressure needle valve. The receiver for the material leaving the reaction zone is heated to about 100–120° C.

It has a discharge point for the steam and an orifice for the batch-wise discharge of the amine containing liquid which can be distilled immediately.

While certain representative embodiments and details have been shown for the purpose of illustrating this invention, it will be apparent to those skilled in the art that various changes and modifications may be made therein without departing from the spirit and scope of the invention.

What is claimed is:

1. A process for the preparation of aromatic carbocyclic primary amines selected from the group consisting or aromatic carbocyclic primary monoamines and meta- and para-aromatic carbocyclic primary diamines which comprises heating water and the disitillation residue obtained when distilling the product of phosgenation of said aromatic primary amine to form the corresponding isocyanate, to a temperature within the range of from about 160° C. to about 250° C. until said distillation residue is converted by reaction with said water to said aromatic primary amine.

2. The process of claim 1 wherein said aromatic carbocyclic primary amine is 2,4-toluylene diamine.

3. The process of claim 1 wherein said aromatic carbocyclic primary amine is a mixture of 2,4- and 2,6-toluylene diamine.

4. The process of claim 1 wherein said heating is continued for at least about 15 minutes.

5. A process for the preparation of aromatic carbocyclic primary amines selected from the group consisting of aromatic carbocyclic primary monoamines and meta- and para-aromatic carbocyclic primary diamines which comprises heating water and the distillation residue obtained when distilling the product of the phosgenation of said aromatic primary amine to form the corresponding isocyanate to a temperature within the range of from about 160° C. to about 250° C. while said distillation residue is mixed with an alkali until said distillation residue is converted by reaction with said water to said aromatic amine.

6. The process of claim 5 wherein said alkali is an alkali metal hydroxide.

7. The process of claim 5 wherein said alkali is sodium hydroxide.

8. The process of claim 5 wherein said distillation residue is heated from about 1 to about 5 minutes.

9. A process for the production of 2,4- and 2,6-toluylene diamine which comprises heating water and the distillation residue obtained when distilling the product of the phosgenation of said 2,4- and 2,6-toluylene diamine to form the corresponding diisocyanates to a temperature within the range of from about 160° C. to about 250° C. while said distillation residue is mixed with an alkali metal hydroxide until said distillation residue is converted by reaction with said water to said diamine.

References Cited in the file of this patent

UNITED STATES PATENTS

| | | |
|---|---|---|
| 1,918,997 | Weiland | July 18, 1933 |
| 2,153,960 | Jenkins | Apr. 11, 1939 |
| 2,884,457 | Ferstandig | Apr. 28, 1959 |

FOREIGN PATENTS

| | | |
|---|---|---|
| 795,639 | Great Britain | May 28, 1958 |